(12) United States Patent  
Chaussade et al.

(10) Patent No.: US 8,782,378 B2  
(45) Date of Patent: Jul. 15, 2014

(54) DYNAMIC INSTRUCTION SPLITTING

(75) Inventors: Nicolas Chaussade, Mouans-Sartoux (FR); Rémi Teyssier, Grasse (FR)

(73) Assignee: ARM Limited, Cambridge (GB)

( * ) Notice: Subject to any disclaimer, the term of this patent is extended or adjusted under 35 U.S.C. 154(b) by 974 days.

(21) Appl. No.: 12/923,320

(22) Filed: Sep. 14, 2010

(65) Prior Publication Data

US 2012/0066481 A1  Mar. 15, 2012

(51) Int. Cl.
*G06F 9/38* (2006.01)
*G06F 9/30* (2006.01)

(52) U.S. Cl.
CPC .......... *G06F 9/30072* (2013.01); *G06F 9/3017* (2013.01); *G06F 9/3836* (2013.01); *G06F 9/384* (2013.01); *G06F 9/3861* (2013.01)
USPC ...................................................... 712/220

(58) Field of Classification Search
CPC combination set(s) only.
See application file for complete search history.

(56) References Cited

U.S. PATENT DOCUMENTS 7,155,599 B2 * 12/2006 Jourdan et al. ................ 712/227
8,151,088 B1 * 4/2012 Bao et al. ......................... 712/11
8,250,507 B1 * 8/2012 Agarwal et al. ............... 716/110
8,291,400 B1 * 10/2012 Lee et al. ....................... 717/161
8,458,671 B1 * 6/2013 Hostetter et al. .............. 717/131

* cited by examiner

*Primary Examiner* — Eric Coleman
(74) *Attorney, Agent, or Firm* — Nixon & Vanderhye P.C.

(57) ABSTRACT

A data processing apparatus and method are provided. The data processing apparatus is configured to perform data processing operations in response to data processing instructions including a multiple operation instruction, in response to which multiple data processing operations are performed. The data processing apparatus comprises two or more data processing units configured to perform the data processing operations and an instruction arbitration unit configured to perform sub-division of a multiple operation instruction into a plurality of sub-instructions and to perform allocation of the plurality of sub-instructions amongst the two or more data processing units, wherein each sub-instruction is arranged to cause one of the two or more data processing units to perform at least one data processing operation of the multiple data processing operations. The instruction arbitration unit is configured to perform the sub-division and the allocation dynamically in dependence on a current availability of a resource for each of the two or more data processing units, enabling more efficient usage of the resources of each of the data processing units to be made.

19 Claims, 5 Drawing Sheets

DYNAMIC INSTRUCTION SPLITTING

FIELD OF THE INVENTION

The present invention relates to a data processing apparatus which is configured to perform data processing operations in response to data processing instructions. In particular, the present invention relates to a data processing apparatus which is configured to perform multiple data processing operations in response to a multiple operation instruction.

DESCRIPTION OF THE PRIOR ART

It is known for data processing apparatus to be configured to be responsive to a multiple operation instruction, the multiple operation instruction causing the data processing apparatus to carry out a plurality of operations. For example, the "load multiple" (LDM) instruction defined as part of the ARM instruction set causes a data processing apparatus to perform a sequence of load operations. This has clear advantages in terms of code density, since a sequence of similar operations can be encoded in a single instruction. The individual operations which make up the response of the data processing apparatus to a multiple operation instruction are sometimes termed micro operations or "micro ops".

A data processing apparatus which is configured to respond to a multiple operation instruction may have a number of data processing units which are the components which actually carry out the data processing operations in response to the multiple operation instruction. These data processing units may for example be execution units which can execute the multiple operation instruction. However, they may also, for example, take the form of recovery blocks in a data processing apparatus which is configured to perform register renaming. Register renaming is a known technique for improving the performance of a data processing apparatus which is configured to perform out-of-order execution of program instructions. The renaming of registers allows the reuse of registers in a program sequence, which would otherwise result in conflicting register usage when allowing out-of-order program execution.

Associated with the technique of register renaming, in a data processing apparatus which executes conditional instructions, is the technique of register recovery for instructions which have failed their condition codes, but have also had the registers to which they refer renamed. Due to the condition code failure, it is necessary to undo the register renaming which has been carried out for such an instruction. To this end, a data processing apparatus which performs register renaming is known to also be provided with a recovery block which, for an instruction which is identified as having condition code failed, to access the register bank and revert the renamed registers to their previous values. Since a multiple operation instruction may also fail its condition codes, the register recovery process carried out by a recovery block may also comprise multiple data processing operations in response to the multiple operation instruction.

When a data processing operation has two or more data processing units configured to perform data processing operations in response to a multiple operation instruction, the data processing apparatus may be configured to allocate the multiple operation instruction to a given data processing unit. However, the allocation of a multiple operation instruction to a particular data processing unit may result in an inefficient usage of the resources of the data processing apparatus, for example where one data processing unit is inactive, whilst another has a number of data processing operations to perform in accordance with the multiple operation instruction allocated to it.

It would be desirable to provide an approved technique for handling multiple operation instructions in a data processing apparatus.

SUMMARY OF THE INVENTION

Viewed from a first aspect, the present invention provides a data processing apparatus configured to perform data processing operations in response to data processing instructions, wherein said data processing instructions comprise a multiple operation instruction, said data processing apparatus configured to perform multiple data processing operations in response to said multiple operation instruction, said data processing apparatus comprising: two or more data processing units configured to perform said data processing operations; and an instruction arbitration unit configured to perform sub-division of said multiple operation instruction into a plurality of sub-instructions and to perform allocation of said plurality of sub-instructions amongst said two or more data processing units, wherein each sub-instruction is arranged to cause one of said two or more data processing units to perform at least one data processing operation of said multiple data processing operations, wherein said instruction arbitration unit is configured to perform said sub-division and said allocation dynamically in dependence on a current availability of a resource for each of said two or more data processing units.

According to the techniques of the present invention, in a data processing apparatus which is configured to perform multiple data processing operations in response to a multiple operation instruction, an instruction arbitration unit is provided which is configured to sub-divide the multiple operation instruction into a plurality of sub-instructions and to allocate those sub-instructions amongst two or more data processing units in the data processing apparatus. Furthermore, the instruction arbitration unit performs this sub-division and allocation of sub-instructions dynamically in dependence on a current availability of a resource for each of the two or more data processing units. If a multiple operation instruction is allocated in its entirety to one data processing unit, this may result in a less than optimal operating efficiency for the data processing apparatus. For example, whilst one data processing unit is performing the multiple data processing operations in response to the multiple operation instruction, a second data processing unit may have resource availability which is unused. The atomicity of the multiple operation instruction leads to one data processing unit being fully occupied with performing multiple data processing operations, whilst a second data processing unit may be idle or at least not fully occupied.

However, according to the techniques of the present invention, the instruction arbitration unit monitors the current availability of the resource for each of the two or more data processing units and performs sub-division of the multiple operation instruction into a plurality of sub-instructions in dependence on the current resource availability. Furthermore; the instruction arbitration unit allocates the plurality of sub-instructions amongst the two or more data processing units in dependence on that current resource availability. Accordingly, a multiple operation instruction may still be allocated as an atomic operation to a single data processing unit, however, when a second data processing unit has resource availability the multiple operation instruction may instead be sub-divided into at least two sub-instructions which are then allocated amongst the two or more data processing units.

Consequently, more efficient use of the resources within the data processing apparatus results.

The resource for which the availability is monitored by the instruction arbitration unit could take a number of forms, but in one embodiment said resource is a read/write port. Read and write ports provided in a data processing unit may commonly be provided only in limited number, due to the cost overhead of such provision. However, a data processing unit will typically only be able to perform data processing operations such as reading from and writing to a register bank by using such a read/write port. Consequently, when the instruction arbitration unit is configured to perform its sub-division and allocation dynamically in dependence on the current read/write port availability for each of the two or more data processing units, efficient use of these critical ports may be made, typically allocating sub-instructions to those data processing units which have currently available ports.

In one embodiment the resource comprises an instruction execution unit of each data processing unit, said instruction execution unit configured to execute instructions as said data processing operations. When the data processing units are configured to execute instructions, the availability of the instruction execution unit of each data processing unit represents a central factor in the ability of that data processing unit to carry out its data processing operations. Hence more efficient instruction execution can result if the instruction arbitration unit is configured to perform the sub-division and allocation of multiple operation instructions dynamically in dependence on a current availability of the instruction execution unit of each data processing unit.

The instruction arbitration unit may be configured as part of the data processing apparatus in a number of ways, but in one embodiment the instruction arbitration unit forms part of one of said at least two data processing units. This close integration of the instruction arbitration unit and one of the data processing units can be advantageous, for example by allowing the instruction arbitration unit to more closely monitor the operation of that data processing unit.

In some embodiments said instruction arbitration unit is configured initially to allocate said multiple operation instruction to a first data processing unit of said two or more data processing units and said first data processing unit is configured to perform at least one data processing operation of said multiple data processing operations in response to said multiple operation instruction, wherein said instruction arbitration unit is configured to allocate at least one remaining operation of said multiple operations to a further data processing unit when said resource of said further data processing unit becomes available.

Given that the data processing operations associated with a multiple operation instruction may occupy a given data processing unit for a significant period of time, it is advantageous if the instruction arbitration unit is configured to continually monitor the data processing units such that if the resource of data processing unit becomes available whilst another data processing unit is still performing the data processing operations in response to the multiple operation instruction, the instruction arbitration unit can, even at this later stage, sub-divide the remainder of the multiple operation instruction and allocate the corresponding sub-instructions amongst the data processing units. Accordingly, more dynamic allocation efficiency is achieved, by enabling the instruction allocation unit to perform sub-division even at a later stage when second data processing unit resource becomes available.

The sub-division of the multiple operation instruction by the instruction arbitration unit can take place in a number of ways. In one embodiment at least one sub-instruction comprises a further multiple operation instruction. In another embodiment, the at least one sub-instruction comprises a single operation instruction. For example, where the multiple operation instruction is a load multiple instruction (LDM) corresponding to four load operations, the instruction arbitration unit could sub-divide this instruction into two load pair (LDP) instructions, or into a triple load (LDM) instruction and a single load instruction (LDR), or alternatively into four single load (LDR) instructions and so on. This flexibility in the instruction sub-division enables more efficient use of the resources of the data processing apparatus to be made.

In some embodiments said data processing apparatus is configured to perform register renaming, and said two or more data processing units are register recovery units, said register recovery units being configured to perform register recovery operations as said data processing operations. A data processing apparatus which performs register renaming, for example because of the out-of-order program execution which it performs, may also be provided with a register recovery unit which is configured to undo the register renaming process for a given instruction if it is later (after the register renaming for that instruction has been performed) found that the instruction will not be executed. For a multiple operation instruction, a register recovery unit will typically have to perform multiple register recovery data processing operations.

In one embodiment, said multiple operation instruction is a conditional instruction, wherein execution of said conditional instruction is dependent on at least one condition code stored in said data processing apparatus, and wherein said register recovery units are configured to perform said register recovery operations for said multiple operation instruction if said at least one condition code indicates that said conditional instruction should not be executed. Conditional instructions are only executed if their corresponding condition codes in the data processing apparatus are satisfied. Hence, if register renaming has been performed for a conditional instruction, the "condition code failure" of that instruction will then require a register recovery process to be carried out associated with that instruction, to undo the register renaming.

In one embodiment, said data processing apparatus comprises a condition code storage unit configured to store a plurality of sets of condition codes, each set of condition codes associated with an associated conditional instruction. This enables the data processing apparatus to handle a number of conditional instructions, by maintaining a set of condition codes associated with each conditional instruction. For example, when executing instructions out-of-order with respect to program instruction order the relevant condition codes for a given conditional instruction may have a delayed availability, such as when an instruction on which the condition codes depend is executed after that conditional instruction. Storing a plurality of sets of condition codes enables the data processing apparatus to nevertheless keep track of the relevant condition codes for each instruction.

In one embodiment, each register recovery unit has an associated buffer configured to store at least one data processing instruction before it is determined whether said at least one condition code indicates that said conditional instruction will be executed. This enables each register recovery unit to receive an instruction before it is known whether register recovery needs to be performed for that instruction.

It will be recognised that the associated buffer could be configured in a number of ways, but in one embodiment each associated buffer has a FIFO structure.

In some embodiments, said data processing apparatus stores a register association table, said register association table configured to store indications of at least one a source register and at least one target register associated with each of said data processing instructions. The process of register renaming takes the content of a source register and writes that content to a target register. By storing an indication of at least one source register and at least one target register associated with each data processing instruction in a register association table, efficient register recovery processing can result, by referring to the table as required. For a selected instruction reference to the table can then easily allow the target register content to be returned to the source register.

In one embodiment said register association table is configured to store an indication of a source register and a target register for each sub-instruction. For a multiple operation instruction there may be several associated source/target register pairs. However configuring the register association table to store an indication of a source register and a target register for each sub-instruction enables a simple access mechanism into the register association table for the register recovery units.

It will be recognised that the register association table could be configured in a number of ways, but in one embodiment said register association table has a FIFO structure.

In some embodiments said instruction arbitration unit comprises an arbitration table, said arbitration table configured, for each sub-instruction, to store a data processing unit identifier and a pointer into said register association table, said data processing unit identifier identifying the data processing unit allocated that sub-instruction. Providing the instruction arbitration unit with an arbitration table enables the instruction arbitration unit to efficiently administer the sub-division and allocation of a multiple operation instruction, entries in the table indicating both the data processing unit allocated that sub-instruction, and a pointer to the register association table providing an efficient reference to the source and target registers which the data processing unit will need to access.

In some embodiments said two or more data processing units comprise a first data processing unit and a second data processing unit, and wherein said instruction arbitration unit is configured to sub-divide said multiple operation instruction into a first sub-instruction and a second sub-instruction, wherein said instruction arbitration unit is configured to allocate said first sub-instruction to said first data processing unit and to allocate said second sub-instruction to said second data processing unit, and wherein said second data processing unit is configured to perform a second data processing operation related to said second sub-instruction in dependence on a data item used by said first data processing unit when performing a first data processing operation related to said first sub-instruction. Accordingly, the second data processing unit is linked to the first data processing unit. Since the first sub-instruction and second sub-instruction have been sub-divided from one multiple operation instruction, the nature of the data processing operation or operations required to be performed for these sub-instructions will typically be closely related to one another. Hence, by linking the first and second data processing units in this manner, a more efficient configuration results in which a data item does not need to be held by both data processing units, but rather one can derive this information from the other.

In some embodiments said second data processing unit performs said second data processing operation using an incremented version of said data item. For example, where the first data processing unit uses a pointer into the register association table, the second data processing unit may simply increment that pointer to access the indications of the source and target registers on which it must operate.

Viewed from a second aspect the present invention provides a data processing apparatus configured to perform data processing operations in response to data processing instructions, wherein said data processing instructions comprise a multiple operation instruction, said data processing apparatus configured to perform multiple data processing operations in response to said multiple operation instruction, said data processing apparatus comprising: two or more data processing means for performing said data processing operations; and an instruction arbitration means for performing sub-division of said multiple operation instruction into a plurality of sub-instructions and for performing allocation of said plurality of sub-instructions amongst said two or more data processing units, wherein each sub-instruction is arranged to cause one of said two or more data processing means to perform at least one data processing operation of said multiple data processing operations, wherein said instruction arbitration means is configured to perform said sub-division and said allocation dynamically in dependence on a current availability of a resource for each of said two or more data processing units.

Viewed from a third aspect the present invention provides a method of operating a data processing apparatus, said data processing apparatus configured to perform data processing operations in response to data processing instructions, wherein said data processing instructions comprise a multiple operation instruction, said data processing apparatus configured to perform multiple data processing operations in response to said multiple operation instruction using two or more data processing units, the method comprising the steps of: performing sub-division of said multiple operation instruction into a plurality of sub-instructions; performing allocation of said plurality of sub-instructions amongst said two or more data processing units, wherein each sub-instruction is arranged to cause one of said two or more data processing units to perform at least one data processing operation of said multiple data processing operations, wherein said sub-division and said allocation are performed dynamically in dependence on a current availability of a resource for each of said two or more data processing units.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
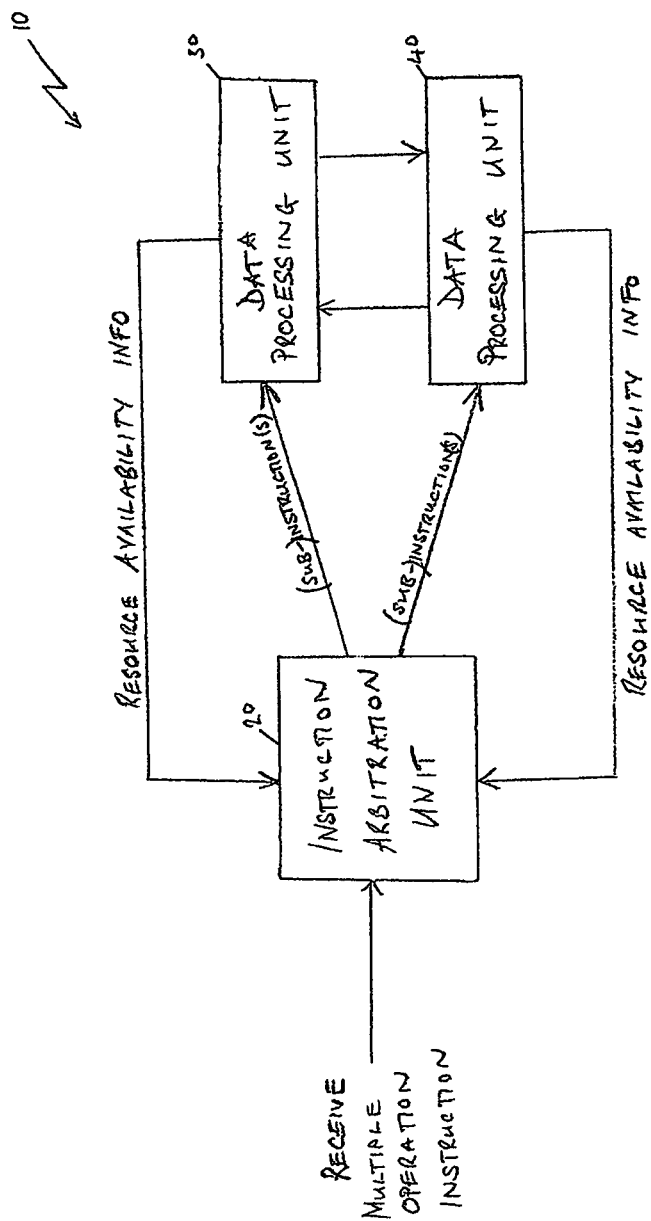
FIG. 1 schematically illustrates a data processing apparatus in one embodiment in which an instruction arbitration unit allocates instructions to two data processing units in dependence on resource availability information from each data processing unit.

FIG. 1 schematically illustrates a data processing apparatus 10 according to one embodiment. The data processing apparatus 10 is configured to perform data processing operations in response to instructions it receives. These instructions include at least one multiple operation instruction for which multiple data processing operations must be performed. The data processing apparatus 10 comprises an instruction arbitration unit 20 and two data processing units 30, 40. In operation, the instruction arbitration unit 20 is configured to receive resource availability information from each data processing unit 30, 40 and on the basis of this information when instruction arbitration unit 20 receives a multiple operation instruction it can sub-divide the multiple operation instruction into a number of sub-instructions which are allocated to the data processing units 30, 40. This can for example happen if the instruction arbitration unit receives resource availability information indicating that both data processing units have an available resource. Alternatively, if the resource availability information indicates that only one data processing unit has an available resource, then the instruction arbitration unit may simply allocate the multiple operation instruction to that data processing unit. The data processing units 30, 40 are also interconnected, such that one can perform its data processing operations with reference to the other. This can be of particular benefit when a multiple operation instruction has been sub-divided between the two data processing units, since the individual operations required in response to a multiple operation instruction may be closely related, for example they may be operations on sequential memory addresses. In this case one data processing unit can simply perform its own operation with reference to an incremented version of the memory address being accessed by the other data processing unit. Alternatively, each data processing unit may perform its operations with reference to information indicated by the instruction arbitration unit. In either situation an efficient configuration may result from one data processing unit acting as a "master" and the other acting as a "slave", wherein the slave can make use of the information used by the master, deriving its own information from the master's.

Figure 2:
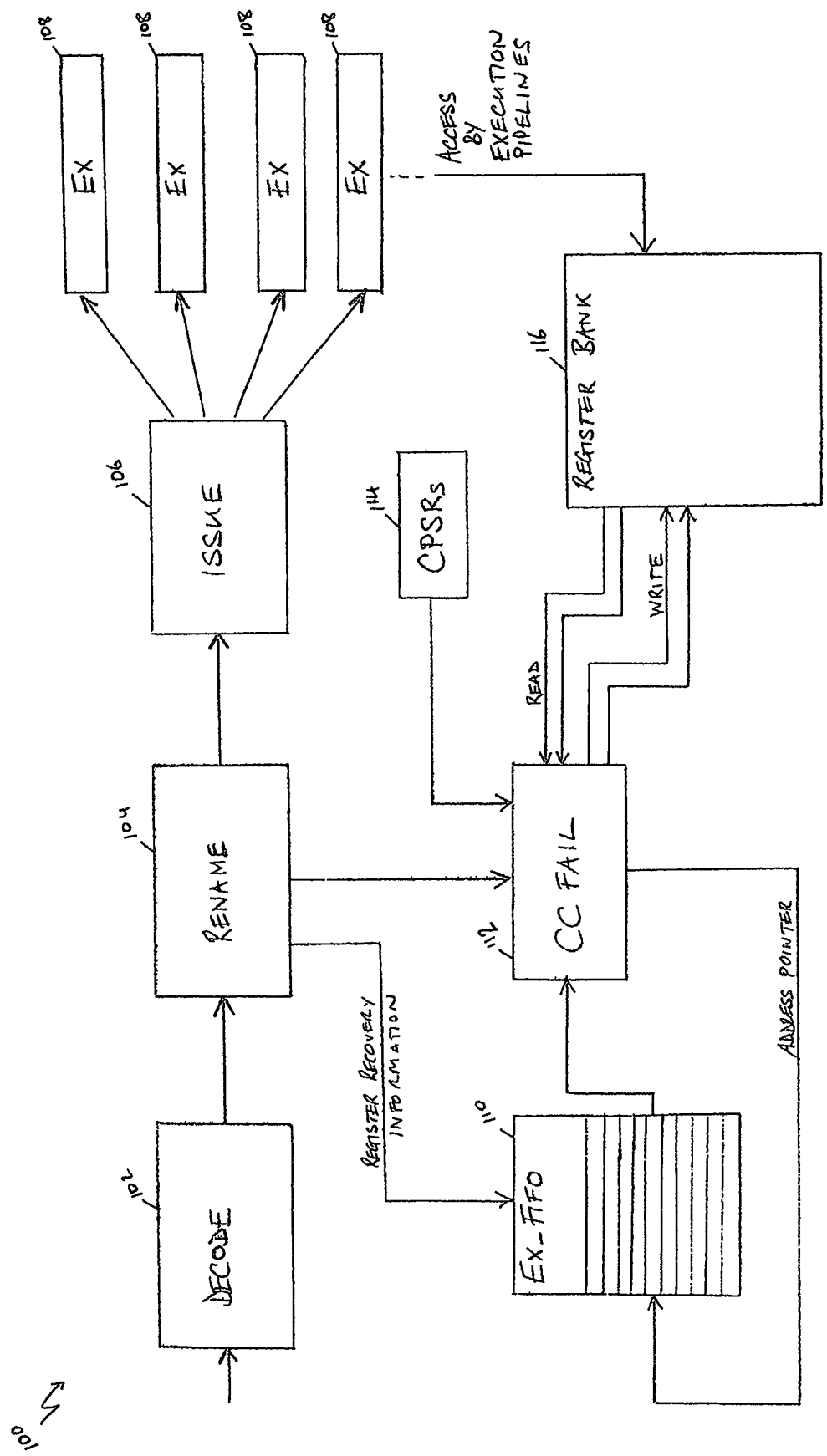
FIG. 2 schematically illustrates a data processing apparatus in one embodiment in which register renaming and register recovery is performed.

FIG. 2 schematically illustrates a data processing apparatus 100 in one embodiment. In overview, this data processing apparatus 100 is a pipelined data processing apparatus which is configured to perform out-of-order program instruction execution. As such, data processing apparatus 100 is configured to perform register renaming, such that the order in which instructions are executed may be varied from the program instruction order without register name clashes occurring. However because the instructions being executed are conditional instructions, which are only executed if particular condition codes within the data processor are satisfied, the data processing apparatus 100 is also configured to perform register recovery, wherein the register renaming previously performed for a given instruction can be undone if it is found that that instruction has failed its condition codes.

The general flow of program instruction execution is schematically illustrated in FIG. 2 by decode unit 102, rename unit 104, issue unit 106 and execution units 108. Fetched instructions are received by decode unit 102 and are decoded. Rename unit 104 then performs register renaming for an instruction as required before passing the instruction to issue stage 106, where the instructions are issued to the execution pipelines 108 for execution. Execution pipelines 108 access the register bank 116 to carry out instruction execution.

Also associated with the instruction execution process is exception FIFO (EX_FIFO) 110 which maintains a list of the instructions which are currently in the process of being executed (i.e. have not completed yet) in the execution pipeline. The register renaming unit 104 causes information to be stored in association with each instruction listed in the EX_FIFO 110 which is indicative of the register renaming which has been carried out. In particular, the source and target register (in the register bank 116) used in the renaming process are stored in association with the corresponding instruction. This information is necessary so that the register renaming can be undone if necessary. The register recovery process is described in more detail hereinafter.

Instructions for which register renaming has been performed by the rename unit 104 are also passed to CC fail unit 112, which temporarily buffers these instructions before it is known whether their associated condition codes have been satisfied or not. Due to the out-of-order instruction execution performed by data processing apparatus 100, a set of condition codes are maintained for each conditional instruction that is in the execution pipeline, as shown by the CPSRs 114. The CPSR values 114 correspond to a set of processor state values associated with each instruction.

On the basis of the CPSR information received for a given instruction, it is determined if that instruction has failed its condition codes. Each instruction passed from the rename unit 104 is temporarily buffered in CC fail unit 112 to allow time for its condition codes to be resolved. When an instruction is determined to have failed its condition codes, then CC fail unit 112 is configured to retrieve the relevant register recovery information from EX_FIFO 110. On the basis of this information CC fail unit 112 then reads from and writes to register bank 116 to recover the relevant register(s).

Figure 3:
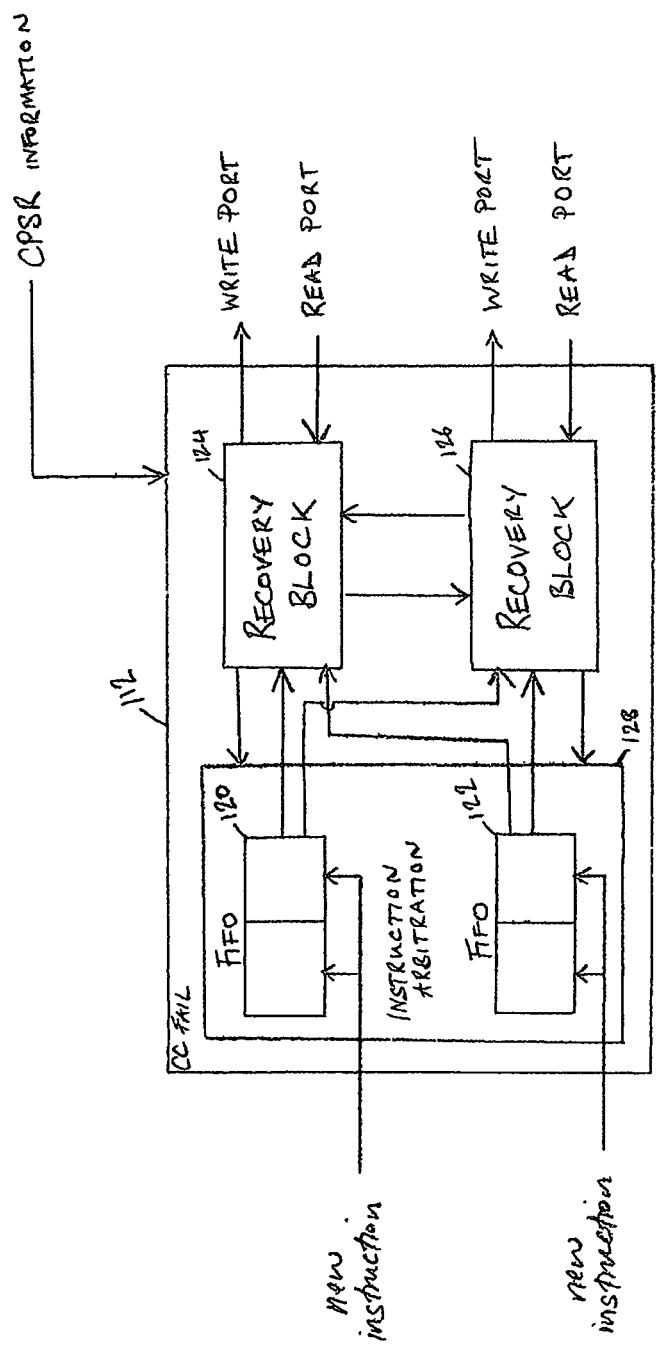
FIG. 3 schematically illustrates in more detail the CC fail unit shown in FIG. 2.

FIG. 3 schematically illustrates in more detail the CC fail unit 112 shown in FIG. 2. Instructions passed to CC fail unit 112 are stored in either FIFO 120 or FIFO 122. On the basis of the CPSR information received by CC fail unit 112, an instruction will either be allowed to be overwritten in its FIFO (if it satisfies its condition codes) or the CC fail unit will carry out register recovery for that instruction (if it fails its condition codes). In this embodiment the FIFOs 120 and 122 form part of the instruction arbitration unit 128, which receives resource availability information from each recovery block 124, 126. Here the resource being monitored is the read/write ports for each recovery block. The availability of these ports are central to each recovery block's ability to perform register recovery. On the basis of this resource availability information, the instruction arbitration unit 128 can sub-divide a multiple operation instruction in either FIFO such that it is handled in part by recovery block 124 and in part by recovery block 126. For example, if a load multiple instruction LDM is currently in FIFO 120, and the instruction arbitration unit 128 is notified that the read/write ports of both the recovery blocks 124 and 126 are currently free, the instruction arbitration unit 128 can sub-divide the LDM into two sub-instructions (e.g. where the LDM has four operations, dividing it into two load pair (LDP) instructions). The instruction arbitration unit 128 then passes a load pair instruction to each recovery block.

Figure 4:
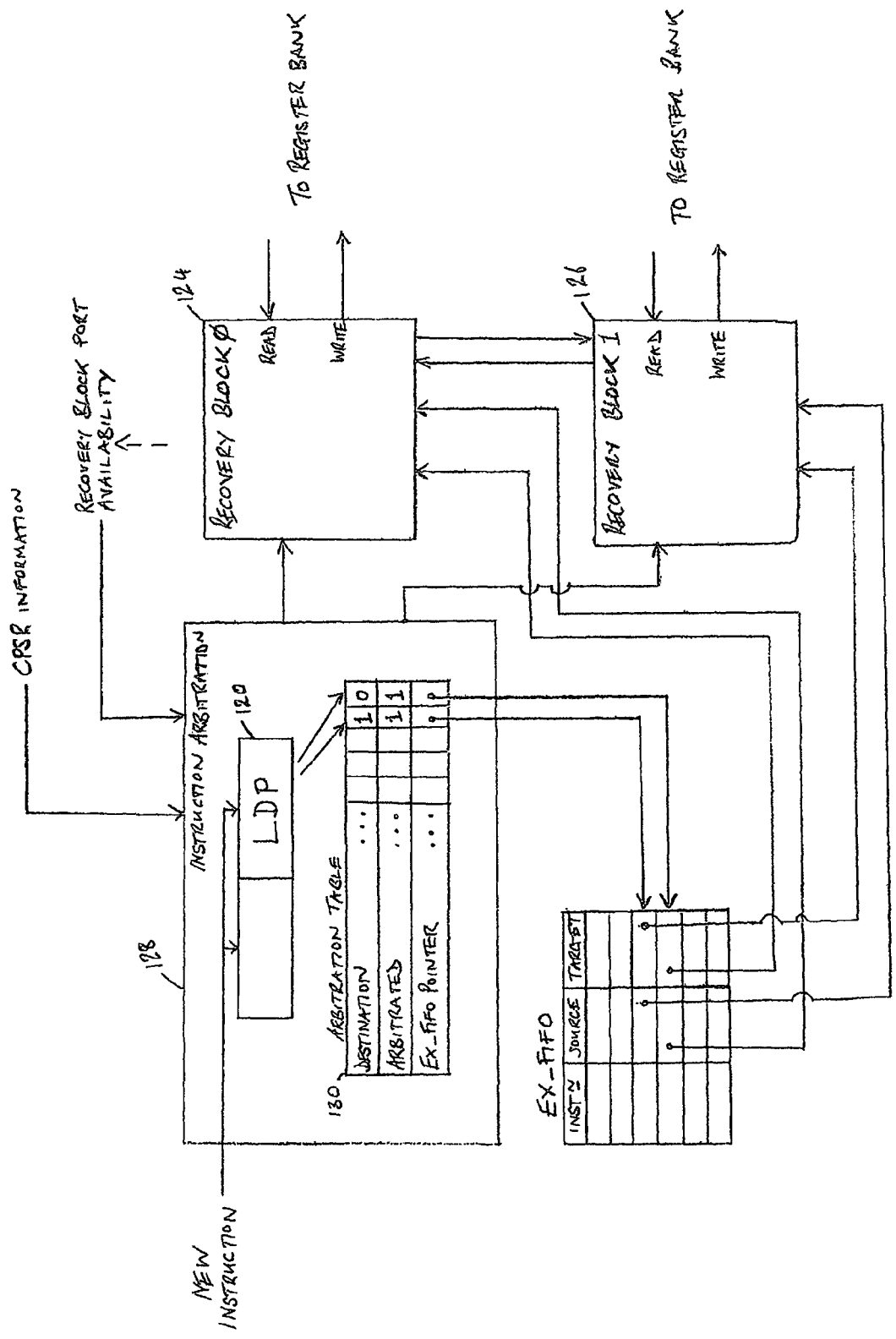
FIG. 4 schematically illustrates in more detail the operation of the recovery blocks shown in FIG. 3.

FIG. 4 schematically illustrates in more detail the operation of instruction arbitration unit 128 in FIG. 3. When a new instruction enters FIFO 120, the instruction arbitration unit 128 is configured to decide how that instruction should be sub-divided and allocated between recovery blocks 124 and 126. This is done with reference to an arbitration table 130 maintained within instruction arbitration unit 128, which tracks the selected destination for an instruction, whether it has been arbitrated or not and contains a pointer into EX_FIFO 110 indicating the entry corresponding to the instruction. Each new instruction received by FIFO 120 is also sent to EX_FIFO 110, which is configured to provide the recovery blocks with the required read and write pointers for the recovery operations.

For example in the illustrated situation, the load pair (LDP) instruction illustrated is pending in FIFO 120 and instruction arbitration unit 128 has determined that (on the basis of its CPSR information) this LDP instruction requires register recovery. Instruction arbitration unit has also received availability information regarding the ports of the recovery blocks, which indicates that both recovery block 124 and recovery block 126 have available ports. Thus the instruction arbitration unit sub-divides the LDP instruction into two entries in the arbitration table, one of which is allocated to each recovery block and for which the corresponding EX_FIFO pointer is entered into the arbitration table. Then, the instruction arbitration unit 128 signals to each recovery block 124, 126 that it has a sub-instruction to recover and using the EX_FIFO pointers from the arbitration table, the information of the relevant source and target registers are passed to the respective recovery blocks. Each recovery block then reads in (via its respective read port) from the source register named and writes (via its respective write port) to the target register named. Furthermore, since it is known that the two sub-instructions derived from this LDP instruction have sequential entries in the EX_FIFO, only the pointer for the first sub-instruction need be passed to the recovery block 124. Recovery block 124 then acts as the "master" recovery block, to which recovery block 126 links itself as the "slave" recovery block, so that it can simply increment the pointer used by recovery block 124 to access the required entry in the EX_FIFO.

In another situation it may be the case that, when it is determined that register recovery is required to be performed for an instruction in FIFO 120, the recovery block 126 is not available (i.e. its read/write ports are indicated as being occupied). In this case the instruction arbitration unit can just allocate the instruction to recovery block 124. However, if the instruction is a multiple operation instruction that will take several iterations to process, recovery block 126 may become available when more than one operation remains to be performed. For example, if an LDM instruction corresponding to four load operations is received in FIFO 120 and recovery block 126 is currently busy with another recovery operation, the instruction arbitration unit can mark four corresponding slots in the arbitration table 130 as "destination 0", i.e. allocating the LDM as a whole to recovery block 124. However, if when recovery block 124 is in the process of performing the register recovery for this LDM the instruction arbitration unit receives an indication that the read/write ports of recovery block 126 are now available, it can amend the slots in the arbitration table corresponding to those parts of the LDM which have not yet been register recovered, marking at least one of these as "destination 1", i.e. allocating them to recovery block 126. Thus the LDM instruction, even part way through its register recovery process, can be sub-divided into, say, two load pair (LDP) instructions, each of which is handled by a different recovery block.

Figure 5:
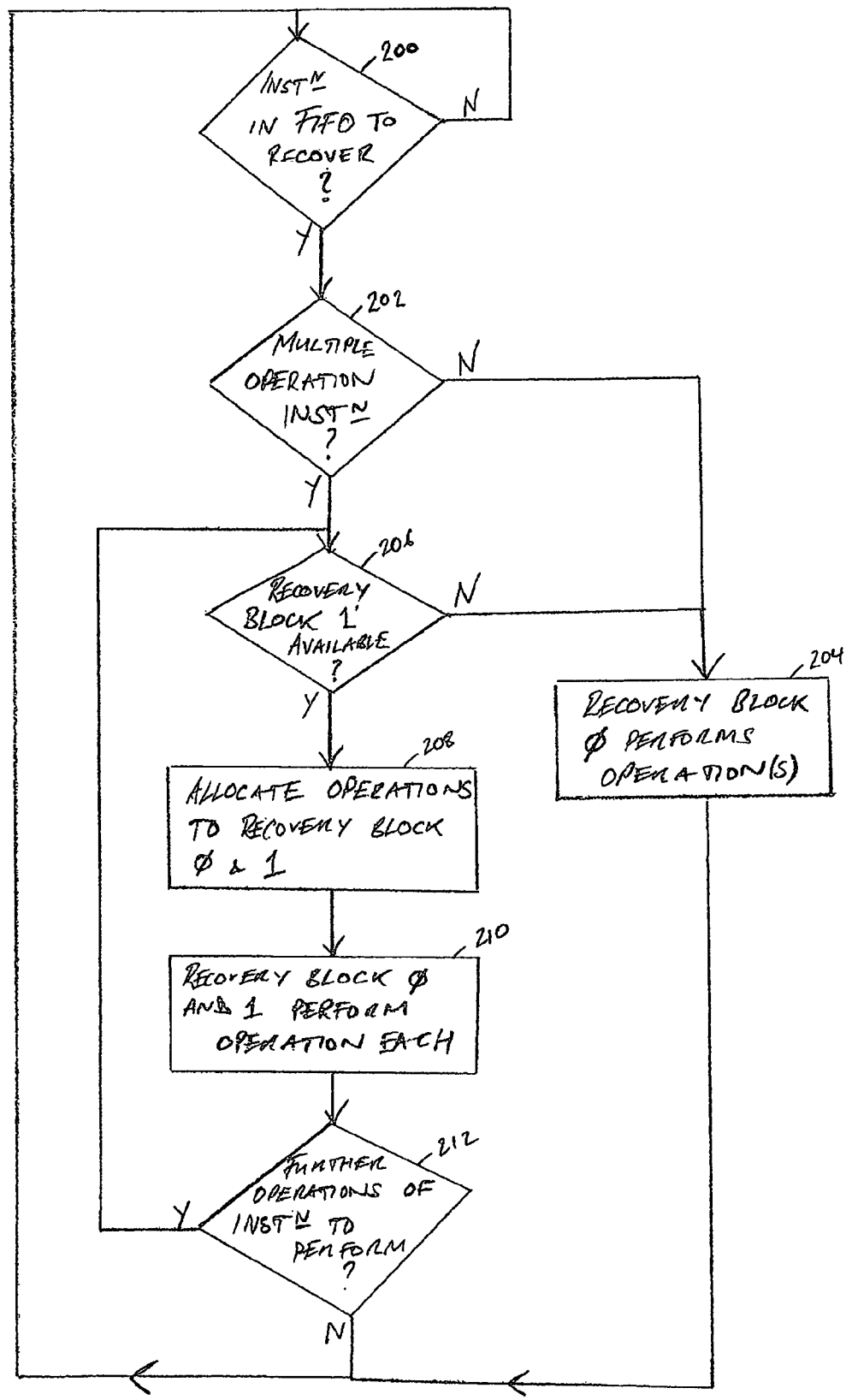
FIG. 5 schematically illustrates a basic sequence of steps that is taken in a data processing apparatus according to one embodiment.

FIG. 5 schematically illustrates a basis series of steps performed by the instruction arbitration unit 128. The flow begins at step 200, where it loops on itself until it is determined (based on the corresponding CPSR information) that an instruction is in the FIFO 120 for which register recovery must be performed. Then the flow proceeds to step 202, where it is determined if the instruction is a multiple operation instruction. If it is not, then at step 204 the (single operation) instruction is allocated to recovery block 0 (labelled 124 in FIG. 4) and the flow returns to step 200. If however the instruction is determined to be a multiple operation instruction at step 202, then at step 206 it is determined if recovery block 1 (labelled 126 in FIG. 4) is available (i.e. its read/write ports are indicated as not currently being busy). If it is not available, then the flow proceeds to step 204, and the recovery block 0 performs the required operations. However, if it is available, then at step 208 the instruction arbitration unit 128 allocates the operations between the two recovery blocks, and at step 210, each recovery block performs an operation each. Finally at step 212 it is determined if there are further recovery operations to perform in association with this instruction in FIFO 120. If there are, the flow returns to step 206. If there are not, the flow returns to step 200.

Although the embodiments described above are predominantly concerned with the allocation of instructions to register recovery blocks, it should be noted that the techniques of the present invention are more generally applicable. In particular the data processing operations performed need not be register recovery operations, but in another embodiment are instruction execution operations. In this embodiment the function of the instruction arbitration unit is to monitor more than one instruction execution unit and, when more than one instruction execution unit is currently available, to sub-divide a multiple operation instruction into sub-instructions and to allocate those sub-instructions to the plural instruction execution units for execution in dependence on their availability to execute instructions.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus configured to perform data processing operations in response to data processing instructions, wherein said data processing instructions comprise a multiple operation instruction, said data processing apparatus configured to perform multiple data processing operations in response to said multiple operation instruction, said data processing apparatus comprising:

two or more data processing units configured to perform said data processing operations; and an instruction arbitration unit configured to perform sub-division of said multiple operation instruction into a plurality of sub-instructions and to perform allocation of said plurality of sub-instructions amongst said two or more data processing units, wherein each sub-instruction is arranged to cause one of said two or more data processing units to perform at least one data processing operation of said multiple data processing operations, wherein said instruction arbitration unit is configured to perform said sub-division and said allocation dynamically in dependence on a current availability of a resource for each of said two or more data processing units, wherein said data processing apparatus is configured to perform register renaming, and said two or more data processing units are register recovery units, said register recovery units being configured to perform register recovery operations as said data processing operations.

2. A data processing apparatus as claimed in claim 1, wherein said resource is a read/write port.

3. A data processing apparatus as claimed in claim 1, wherein said resource comprises an instruction execution unit of each data processing unit, said instruction execution unit configured to execute instructions as said data processing operations.

4. A data processing apparatus as claimed in claim 1, wherein said instruction arbitration unit forms part of one of said at least two data processing units.

5. A data processing apparatus as claimed in claim 1, wherein said instruction arbitration unit is configured initially to allocate said multiple operation instruction to a first data processing unit of said two or more data processing units and said first data processing unit is configured to perform at least one data processing operation of said multiple data processing operations in response to said multiple operation instruction,
wherein said instruction arbitration unit is configured to allocate at least one remaining operation of said multiple operations to a further data processing unit when said resource of said further data processing unit becomes available.

6. A data processing apparatus as claimed in claim 1, wherein at least one sub-instruction comprises a further multiple operation instruction.

7. A data processing apparatus as claimed in claim 1, wherein at least one sub-instruction comprises a single operation instruction.

8. A data processing apparatus as claimed in claim 1, wherein said multiple operation instruction is a conditional instruction, wherein execution of said conditional instruction is dependent on at least one condition code stored in said data processing apparatus, and wherein said register recovery units are configured to perform said register recovery operations for said multiple operation instruction if said at least one condition code indicates that said conditional instruction should not be executed.

9. A data processing apparatus as claimed in claim 8, wherein said data processing apparatus comprises a condition code storage unit configured to store a plurality of sets of condition codes, each set of condition codes associated with an associated conditional instruction.

10. A data processing apparatus as claimed in claim 8, wherein each register recovery unit has an associated buffer configured to store at least one data processing instruction before it is determined whether said at least one condition code indicates that said conditional instruction will be executed.

11. A data processing apparatus as claimed in claim 9, wherein each associated buffer has a FIFO structure.

12. A data processing apparatus as claimed in claim 1, wherein said data processing apparatus stores a register association table, said register association table configured to store indications of at least one a source register and at least one target register associated with each of said data processing instructions.

13. A data processing apparatus as claimed in claim 12, wherein said register association table is configured to store an indication of a source register and a target register for each sub-instruction.

14. A data processing apparatus as claimed in claim 12, wherein said register association table has a FIFO structure.

15. A data processing apparatus as claimed in claim 13, wherein said instruction arbitration unit comprises an arbitration table, said arbitration table configured, for each sub-instruction, to store a data processing unit identifier and a pointer into said register association table, said data processing unit identifier identifying the data processing unit allocated that sub-instruction.

16. A data processing apparatus as claimed in claim 1, wherein said two or more data processing units comprise a first data processing unit and a second data processing unit, and wherein said instruction arbitration unit is configured to sub-divide said multiple operation instruction into a first sub-instruction and a second sub-instruction,
wherein said instruction arbitration unit is configured to allocate said first sub-instruction to said first data processing unit and to allocate said second sub-instruction to said second data processing unit, and
wherein said second data processing unit is configured to perform a second data processing operation related to said second sub-instruction in dependence on a data item used by said first data processing unit when performing a first data processing operation related to said first sub-instruction.

17. A data processing apparatus as claimed in claim 16, wherein said second data processing unit performs said second data processing operation using an incremented version of said data item.

18. A data processing apparatus configured to perform data processing operations in response to data processing instructions, wherein said data processing instructions comprise a multiple operation instruction, said data processing apparatus configured to perform multiple data processing operations in response to said multiple operation instruction, said data processing apparatus comprising:
two or more data processing means for performing said data processing operations; and
an instruction arbitration means for performing sub-division of said multiple operation instruction into a plurality of sub-instructions and for performing allocation of said plurality of sub-instructions amongst said two or more data processing units, wherein each sub-instruction is arranged to cause one of said two or more data processing means to perform at least one data processing operation of said multiple data processing operations,
wherein said instruction arbitration means is configured to perform said sub-division and said allocation dynamically in dependence on a current availability of a resource for each of said two or more data processing units, wherein said data processing apparatus is configured to perform register renaming, and said two or more data processing means are register recovery means for performing register recovery operations as said data processing operations.

19. A method of operating a data processing apparatus, said data processing apparatus configured to perform data processing operations in response to data processing instructions, wherein said data processing instructions comprise a multiple operation instruction, said data processing apparatus configured to perform multiple data processing operations in response to said multiple operation instruction using two or more data processing units, the method comprising the steps of:
performing sub-division of said multiple operation instruction into a plurality of sub-instructions;
performing allocation of said plurality of sub-instructions amongst said two or more data processing units, wherein each sub-instruction is arranged to cause one of said two or more data processing units to perform at least one data processing operation of said multiple data processing operations,
wherein said sub-division and said allocation are performed dynamically in dependence on a current availability of a resource for each of said two or more data processing units, wherein said data processing apparatus is configured to perform register renaming, and said two or more data processing units are register recovery units, said register recovery units performing register recovery operations as said data processing operations.

* * * * *